(12) United States Patent
Zhou et al.

(10) Patent No.: US 9,604,534 B1
(45) Date of Patent: Mar. 28, 2017

(54) SELF-POWERED ACTIVE GRILLE SHUTTER SYSTEM

(71) Applicant: TOYOTA MOTOR ENGINEERING & MANUFACTURING NORTH AMERICA, INC., Erlanger, KY (US)

(72) Inventors: Feng Zhou, South Lyon, MI (US); Ercan Mehmet Dede, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 14/949,227

(22) Filed: Nov. 23, 2015

(51) Int. Cl.
*B60K 11/08* (2006.01)
*H02N 1/04* (2006.01)
*B60W 30/02* (2012.01)
*B62D 35/00* (2006.01)

(52) U.S. Cl.
CPC ............ *B60K 11/085* (2013.01); *B60W 30/02* (2013.01); *B62D 35/005* (2013.01); *H02N 1/04* (2013.01)

(58) Field of Classification Search
CPC ....... B60K 11/083; B60W 30/02; H02N 1/04; B62D 35/00
See application file for complete search history.

(56) References Cited

U.S. PATENT DOCUMENTS

| | | | |
|---|---|---|---|
| 7,498,926 B2 | 3/2009 | Browne et al. | |
| 8,727,843 B2 | 5/2014 | McReynolds | |
| 8,979,622 B2 | 3/2015 | Casey | |
| 2006/0286918 A1* | 12/2006 | Vargas | B60H 1/00871 454/155 |
| 2011/0068601 A1 | 3/2011 | Connor et al. | |
| 2011/0198404 A1 | 8/2011 | Dropmann | |

OTHER PUBLICATIONS

Wang, X., et al., "Hybridized Electromagnetic-Triboelectric Nanogenerator for Scavenging Air-Flow Energy to Sustainably Power Temperature Sensors", American Chemical Society Nano, vol. 9, No. 4, pp. 4553-4562, (2015).

Zhang, K., et al., "Hybridized Electromagnetic-Triboelectric Nanogenerator for Scavenging Biomechanical Energy for Sustainably Powering Wearable Electronics", American Chemical Society Nano, vol. 9, No. 4, pp. 3521-3529, (2015).

* cited by examiner

*Primary Examiner* — John Walters
*Assistant Examiner* — James Triggs
(74) *Attorney, Agent, or Firm* — Oblon, McClelland, Maier & Neustadt, L.L.P.

(57) ABSTRACT

A system for powering an active grille shutter assembly comprising a linkage system connected to a shutter, a generator connected to the shutter, an energy storage device connected to the generator, an electric motor connected to and powered by the energy storage device, and connected to the linkage system, and a controller connected to the energy storage device and the electric motor. The position of the shutter is adjusted by the linkage system, the position of the linkage system is adjusted by the electric motor, the operation of the electric motor is controlled by the controller, the electric motor is powered by energy stored in the energy storage device, and the energy storage device receives energy from the operation of the generator.

17 Claims, 8 Drawing Sheets

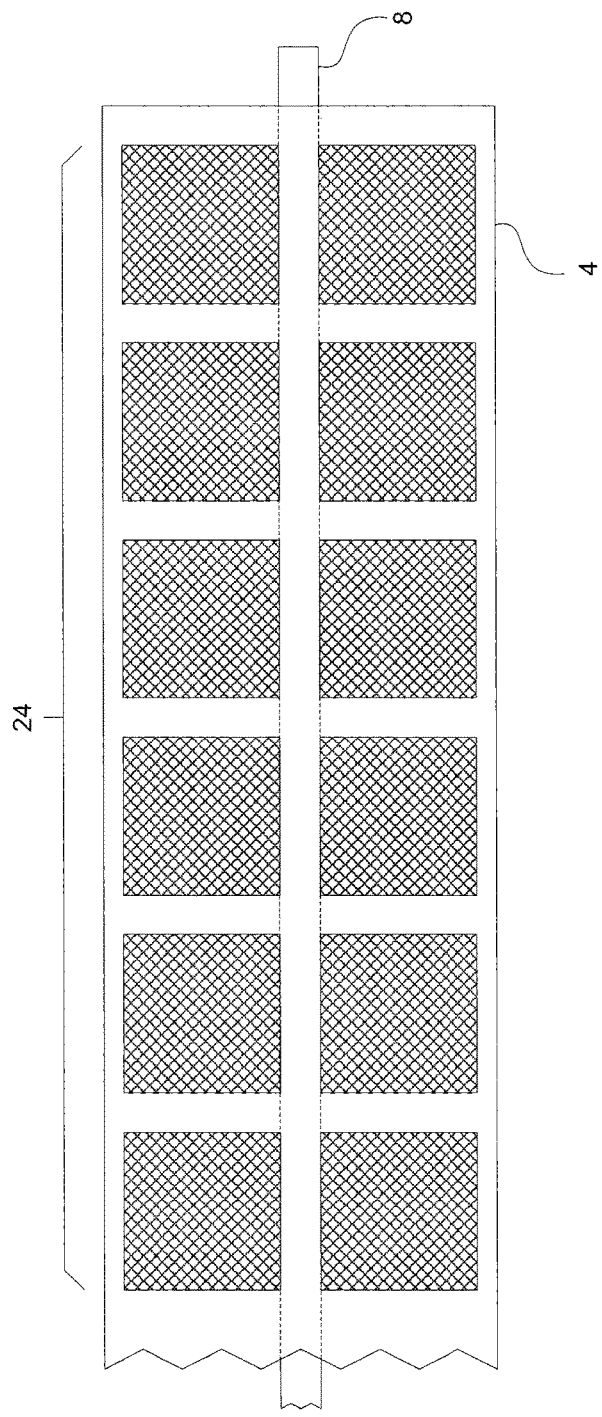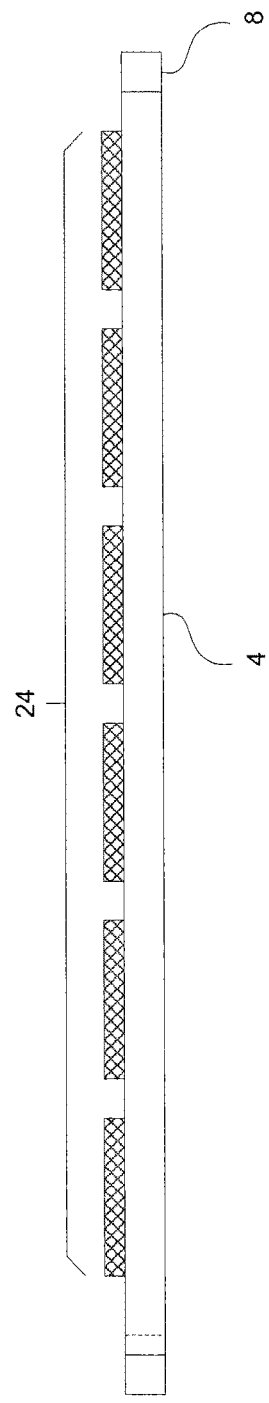
FIG. 4A
FIG. 4B

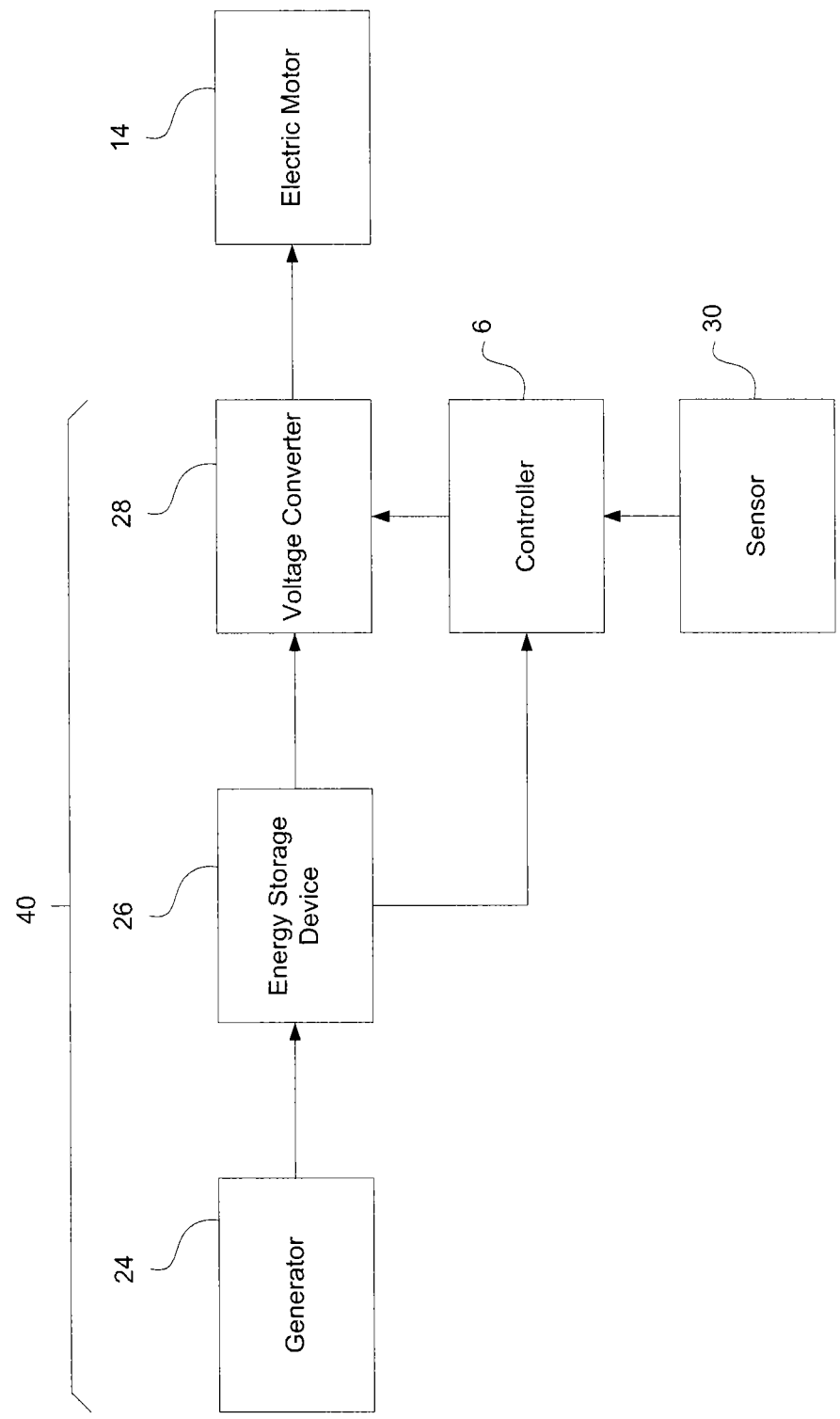

SELF-POWERED ACTIVE GRILLE SHUTTER SYSTEM

BACKGROUND

Field of the Disclosure

The present disclosure is directed toward a self-powered active grille shutter system and method.

Description of the Related Art

There is a need to improve upon the prior art in the field of automotive engineering with respect to fuel saving technology. One area where a fuel efficiency improvement can be obtained is through actively adjusting vehicle aerodynamic drag to minimize overall energy consumption during operation.

SUMMARY

The present disclosure is directed toward a self-powered active grille shutter system and method that reduces vehicle fuel consumption and better optimizes cooling for transitions between varying operating conditions, and generates its own energy for operating the shutter system.

A vehicle's aerodynamic drag force increases exponentially as a function of vehicle speed. Thus power required and fuel consumption increases non-linearly with speed. Changes in the cooling load may not correlate directly with vehicle speed as many other factors are involved. There exists a complex spectrum of cooling system load requirements for various vehicle operating conditions over a range of speed. For example, the cooling system may only need to be utilized intermittently in a case where the vehicle is driven in a largely steady-state mode of operation.

It is advantageous to reduce vehicle drag, especially at high speeds where aerodynamic drag is greatest, to increase vehicle fuel efficiency. One way this can be accomplished is to close off a grille opening or duct when less cooling is needed, and then opening the grille opening or duct, increasing cooling capacity and the attendant aerodynamic drag only when needed.

Using an intelligent, self-powered system for opening and closing the grille or duct further increases vehicle fuel efficiency and simplifies system installation and operation. Such a system also lends itself well to fitment to existing vehicles which may not have been originally designed for use with active grille systems, or self-powered systems.

The present disclosure reduces vehicle fuel consumption by closing ducts and grille shutters and reducing vehicle aerodynamic drag during operational conditions where cooling needs are reduced, and by generating and storing sufficient energy to power the operation of the active grille system independent of that of the main vehicle fuel and energy system.

In one example, generation of the energy to power the operation of the active grille system is accomplished through the use of triboelectric nanogenerators (TENG). TENGs use both contact electrification and electrostatic induction effects to harvest a greater combined amount of energy than what either effect could generate individually.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein:

FIG. 4A is a plan view of a section of a shutter;

FIG. 4B is a front view of a section of a shutter;

FIG. 5 is a diagram of the layout of an embodiment of the electrical system of the grille assembly;

DETAILED DESCRIPTION OF THE EMBODIMENTS

Figure 1:
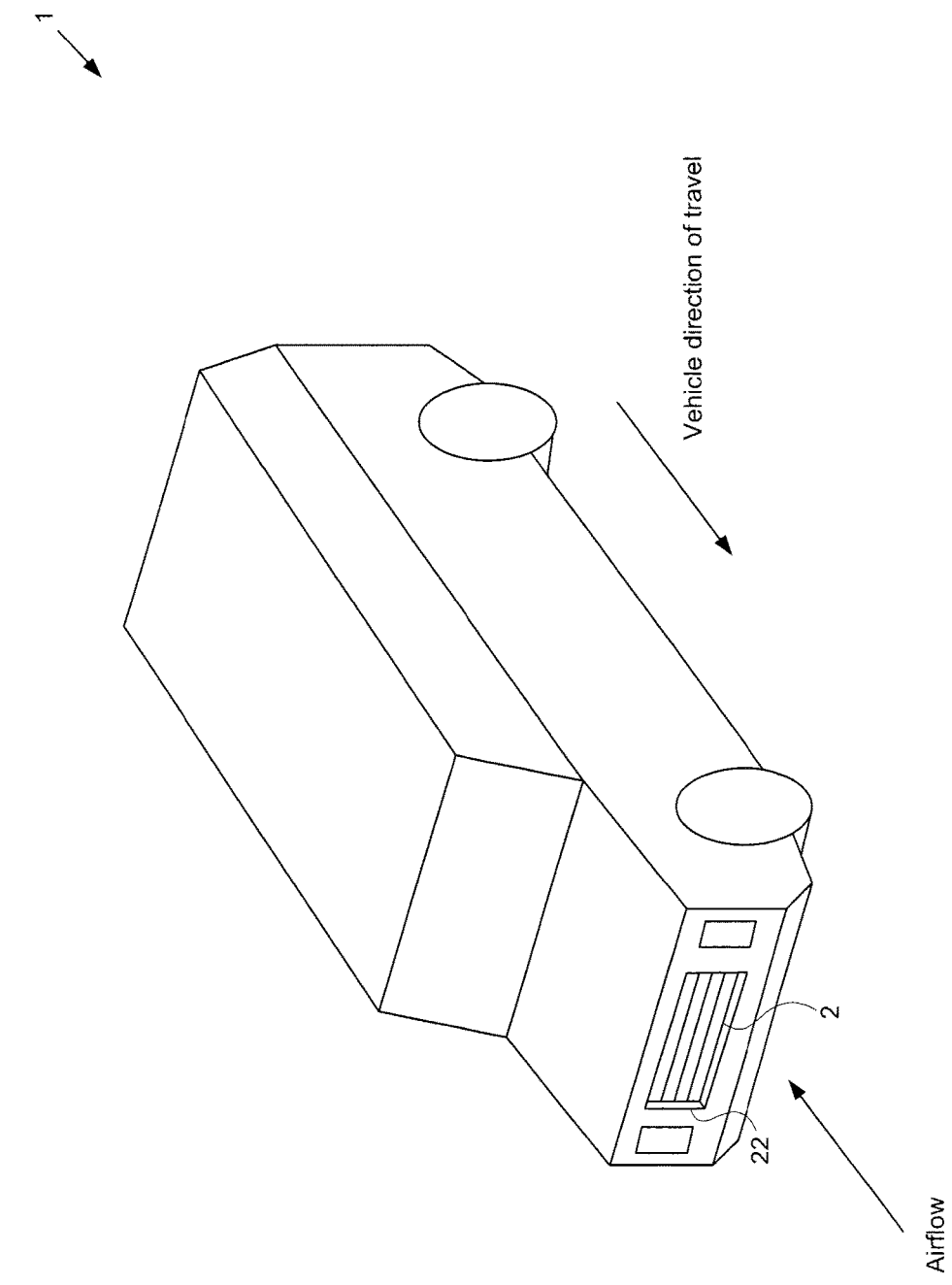
FIG. 1 is a perspective view of an example embodiment of a vehicle.

In the drawings, like reference numerals designate identical or corresponding parts throughout the several views. Further, as used herein, the words "a", "an" and the like generally carry a meaning of "one or more", unless stated otherwise. Words such as "generate" and "harvest" are used interchangeably.

Referring now to the drawings, wherein like reference numerals designate identical or corresponding parts throughout the several views.

FIG. 1 is a perspective view of a vehicle 1 including a duct 22 equipped with a grille assembly 2 for controlling airflow entering the vehicle 1. As the vehicle 1 travels in a forward direction, the grille assembly 2 actively controls the amount of airflow that enters the vehicle 1 through the duct 22 by varying the extent to which the grille assembly 2 is open or closed.

Closing the grille assembly 2 reduces the aerodynamic drag coefficient of the vehicle 1, reducing the energy needed to propel the vehicle 1 at a forward speed. Energy required increases exponentially with increased vehicle speed, thus the ability to close the grille assembly 2 at higher speeds is especially beneficial, particularly in cases where the cooling needs of the vehicle 1 are reduced.

The position of the grille assembly 2 is determined based on various input signals received and processed by the controller 6 (further described in FIG. 5).

Figure 2B:
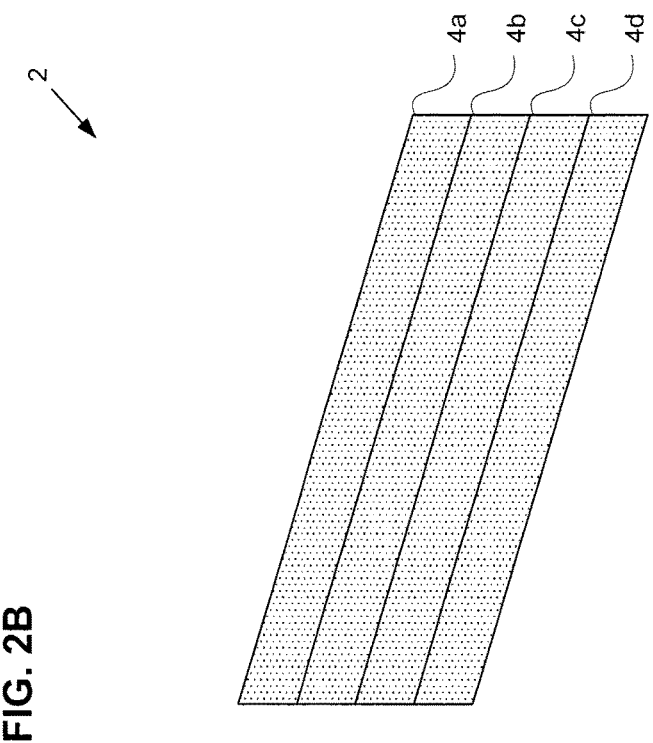
FIG. 2B is a perspective view of an example embodiment of a grille assembly in a closed position.
Figure 2A:
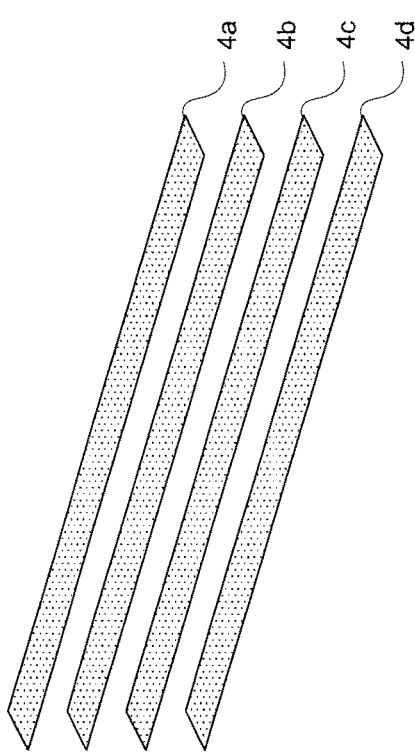
FIG. 2A is a perspective view of an example embodiment of a grille assembly in an open position.

FIG. 2A is a perspective view of an embodiment of the grille assembly 2, including a plurality of shutters 4 (shown as 4a through 4d). The grille assembly 2 is shown in an open position in which the plurality of shutters 4 is positioned such that airflow is directed into the vehicle 1 (FIG. 1) through the grille assembly 2.

FIG. 2B is a perspective view of an embodiment of the grille assembly 2, including the plurality of shutters 4. The grille assembly 2 is shown in a closed position in which the plurality of shutters 4 is positioned such that airflow is deflected from passing through the grille assembly 2.

Figure 3A:
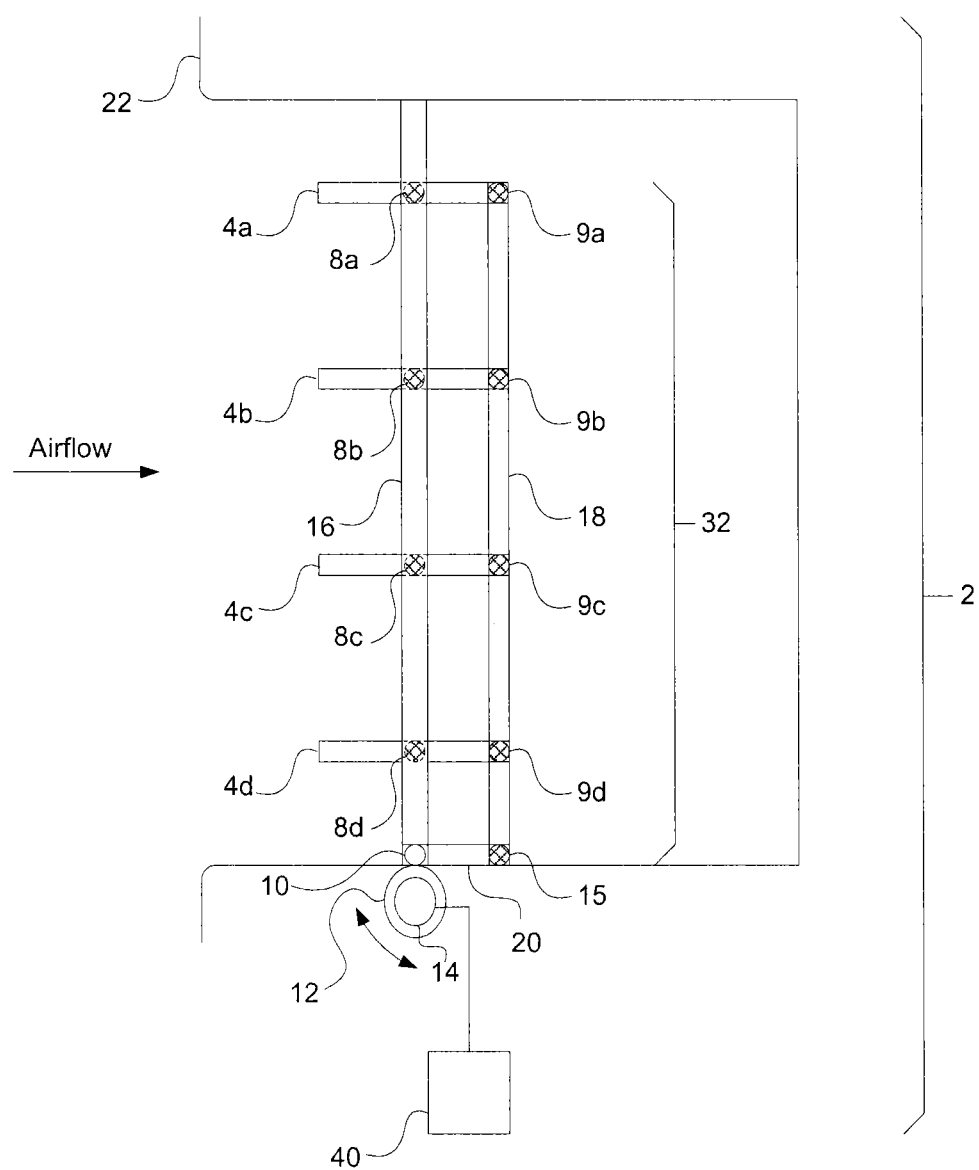
FIG. 3A is a side view of an embodiment of a grille assembly in an open position.

FIG. 3A is a side view of an embodiment of the grille assembly 2 in an open position (as described by FIG. 2A), and including the plurality of shutters 4 (shown as 4a through 4d), a plurality of shutter pins 8 (shown as 8a through 8d), a plurality of link pins 9 (shown as 9a through 9d), a driven gear 10, a drive gear 12, an electric motor 14, a drive link pin 15, a shutter support 16, a link 18, a drive link 20, a duct 22, and an electrical system 40.

The shutter support 16 is disposed within and connected to the duct 22. The plurality of shutter pins 8 is disposed within and rotatably connected to the shutter support 16. The plurality of shutters 4 and the plurality of shutter pins 8 are correspondingly connected. The plurality of shutters 4 is rotatably and correspondingly connected at a first end to a plurality of link pins 9, and the plurality of link pins 9 is rotatably connected to the link 18.

The driven gear 10 is rotatably connected to a first end of the shutter support 16 and rigidly connected to a first end of the drive link 20 such that the driven gear 10 rotates about an axis of rotation within the shutter support 16, and the drive link 20 articulates about the driven gear 10.

A first end of the link 18 is connected to the link pin 9a and the link pin 9a is also connected to the shutter 4a. A second end of the link 18 is rotatably connected to the 15 which is rotatably connected to a second end of the drive link 20, such that the driven gear 10, the shutter support 16, the link 18, and the drive link 20 form a linkage system 32 that includes the 4a.

Further, each shutter pin 8 is connected to a corresponding shutter 4 such that each shutter 4 pivots about a corresponding shutter pin 8. A first end of each shutter 4 includes a corresponding link pin 9, the axis of rotation of each link pin 9 correspondingly disposed parallel to the axis of rotation of the plurality of shutter pins 8. The plurality of link pins 9 is further connected to the link 18 such that the shutter support 16, the link 18, the drive link pin 15, the link pin 9a, the shutter pin 8a, and the drive link 20, form a plurality of parallel linkage systems 32 that includes the plurality of shutters 4, and that move similarly as the driven gear 10 rotates.

The driven gear 10 is connected to and driven by the drive gear 12, and the drive gear 12 is drivingly connected to the electric motor 14. Rotation of the driven gear 10 articulates the drive link 20 and drives the motion of the link 18. Thus motion of the plurality of shutters 4 depends on rotation of the electric motor 14. The electrical system 40 is further described by FIG. 6.

In another example, the plurality of linkage systems 32 may not be parallel to position each of the shutter 4 in differing planes or orientations with respect to each other.

In another example, the plurality of shutter pins 8 may have at least one shutter pin 8 be rotatably connected to a gear train driven by the drive gear 12.

In another example, the linkage system 32 may be directly actuated by the electric motor 14 without a drive gear 12.

Figure 3B:
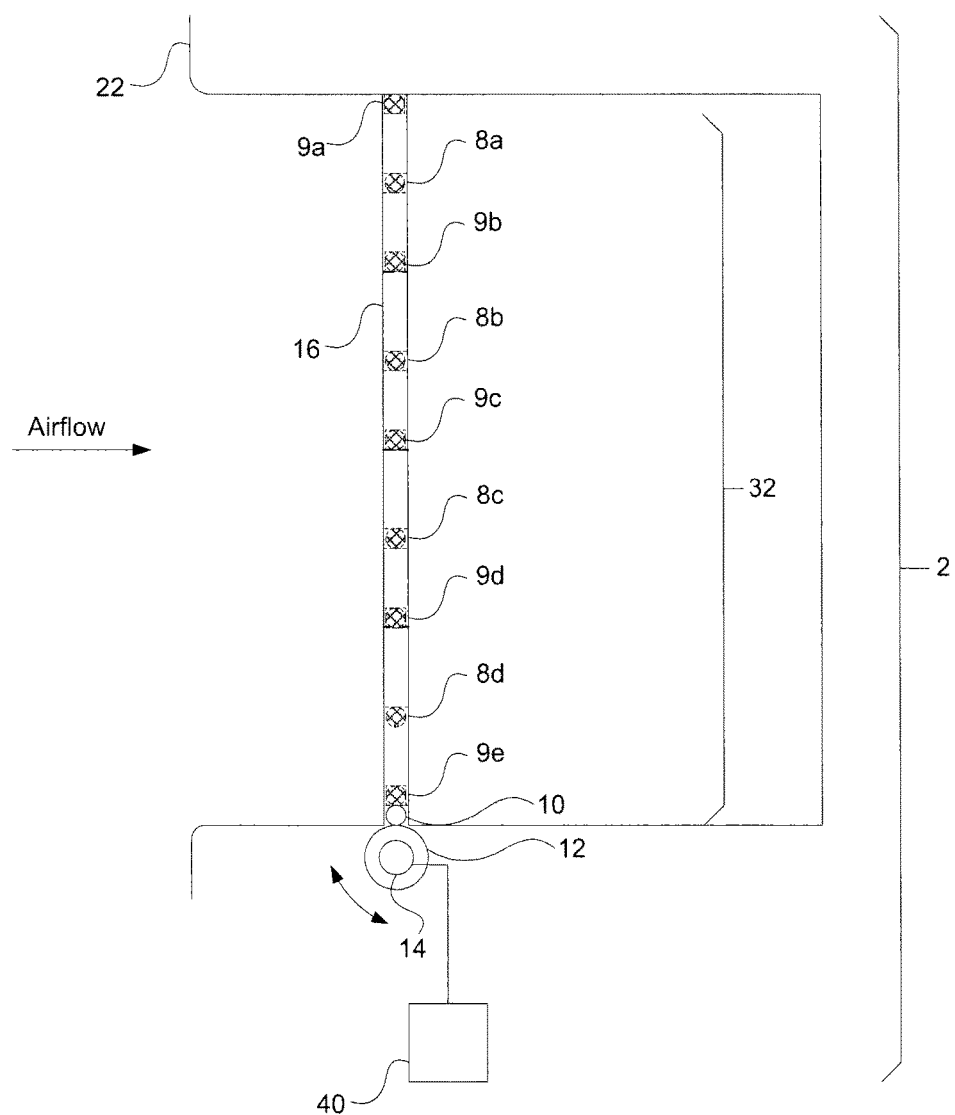
FIG. 3B is a side view of an embodiment of a grille assembly in a closed position.

FIG. 3B is a side view of an embodiment of the grille assembly 2 in a closed position (as described by FIG. 2B), including the plurality of shutter pins 8 (shown as 8a through 8d), the plurality of link pins 9 (shown as 9a through 9d), the driven gear 10, the drive gear 12, the electric motor 14, the shutter support 16, the duct 22, and the electrical system 40. The plurality of shutters 4 (previously shown as 4a through 4d), the drive link pin 15, the link 18, and the drive link 20 are not visible as they are obscured by the shutter support 16, the plurality of shutter pins 8, and the plurality of link pins 9 in this view, as the plurality of parallel linkage systems 32 articulate to a closed position.

The closed position of the grille assembly 2 is the result of the electric motor 14 rotating in a clockwise (CW) direction from the open position of the grille assembly 2 shown in FIG. 3A, resulting in the drive link 20 rotating about the driven gear 10 in a counter clockwise (CCW) direction and raising the link 18 until the link 18 is approximately parallel and in line with the shutter support 16 in this side view.

The plurality of shutters 4 is correspondingly rotated about the plurality of shutter pins 8 and is disposed approximately parallel to the shutter support 16 and the link 18, closing the duct 22 to the indicated airflow.

In another embodiment, a grille assembly 2 may include more than one set of shutters 4 that the controller 6 may control independently of one another such that a first set of shutters 4 may open and close a first area of the duct 22 to airflow while a second set of shutters 4 may open and close a second area of the duct 22 to airflow.

In another example the position of the plurality of shutters 4 may be controlled and rotated by a gear train disposed between the drive gear 12 and each of the corresponding shutter pins 8.

FIG. 4A is a plan view of a section of a shutter 4, including a shutter pin 8 disposed along the length of the shutter 4, and a plurality of generators 24. In one example, the shutter 4 rotates about the shutter pin 8 and the plurality of generators 24 is arranged in series to produce greater output voltage. Each of the generators 24 may produce electricity throughout the range of rotation of the shutter 4 based on vibration of the shutter 4 due to excitation by the airflow, and due to cumulative vibration of the vehicle 1 and the grille assembly 2 from additional sources such as from road surface imperfections, suspension movement, and engine vibration.

Further, the plurality of generators 24 may be arranged in parallel to increase output current, the plurality of generators 24 may be arranged in various combinations of arrays of generator 24 arranged in series and arrays of generator 24 arranged in parallel to produce resultant electrical output of specific voltage and current ranges.

In one embodiment, the generator 24 may utilize the principles of contact electrification and electrostatic induction, or a piezoelectric effect in the operation of the electrical system 40 (further described by FIG. 5), to generate electricity in any position of the shutter 4 while the shutter 4 is subject to vibration from airflow and other sources. See Hybridized Electromagnetic-Triboelectric Nanogenerator for Scavenging Air-Flow Energy to Sustainably Power Temperature Sensors, Wang, et al. (April 2015), retrieved from URL http://pubs.aes.org/doi/abs/10. 1021/acsnano.5b01187. The combined mass of the shutter 4 and the plurality of generators 24 can be designed to optimize efficiency for a specific operating range, depending on the type of vehicle application and vehicle drive cycle. Varying the mass, dimensions, material density, and shape of each of the shutters 4 alters the resonant frequency of the assembly comprising the shutter 4 and the plurality of generators 24, allowing designs to be tailored to vibrate in particular frequency ranges for specific operating conditions.

For example, a shutter 4 is designed with a specific shape and mass to optimize the magnitude of electrical energy it generates in a speed range of a vehicle 1.

In this example the generator 24 is a hybrid triboelectric nanogenerator (TENG) that combines both contact electrification and electrostatic induction to harvest electrical energy from a mechanical input, such as vibration induced by airflow or by surfaces with which the generator 24 is in contact.

Figure 6A:
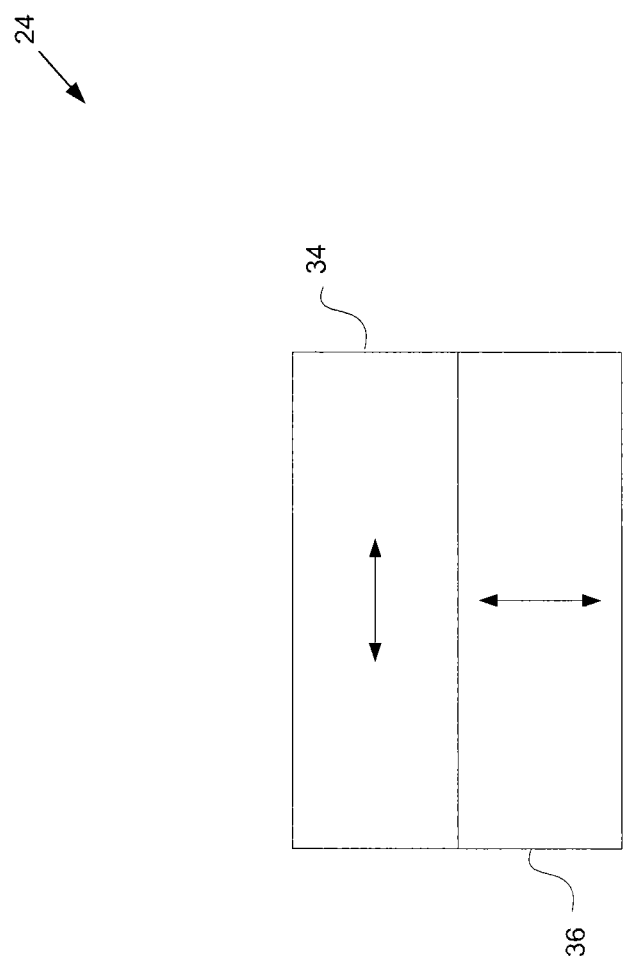
FIG. 6A is a diagram of an embodiment of a hybridized triboelectric nanogenerator (TENG)
Figure 6C:
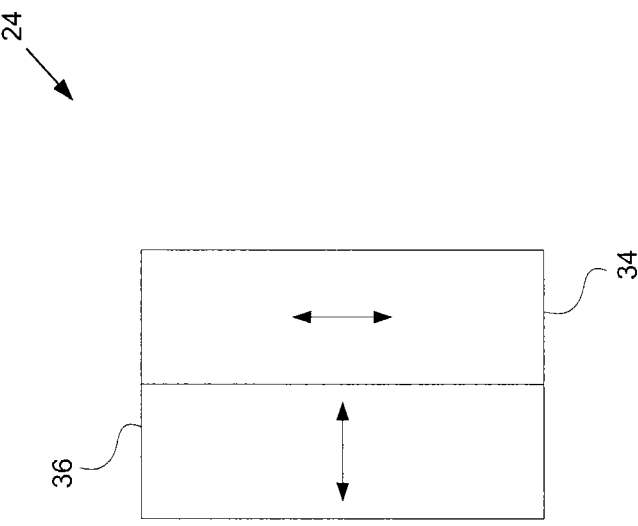
FIG. 6C is a diagram of an embodiment of a TENG in a vertical orientation.
Figure 6B:
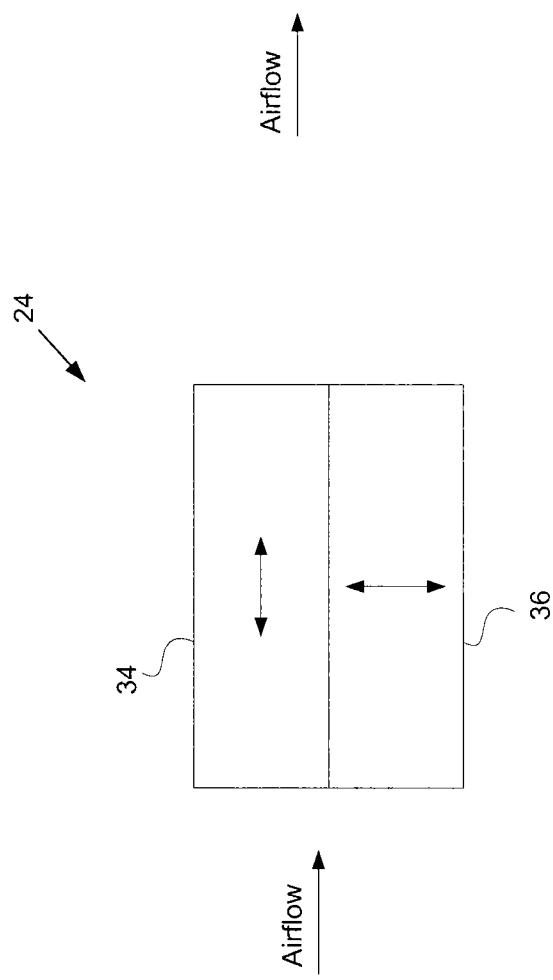
FIG. 6B is a diagram of an embodiment of a TENG in a horizontal orientation.

The combination of both the contact electrification and electrostatic induction effects increases the electrical output of the generator 24 compared with using only one effect, and has the flexibility for harvesting energy in more than one axis, providing the ability to harvest energy in any orientation in which the generator 24 is connected to the shutter 4. See Hybridized Electromagnetic-Triboelectric Nanogenerator for Scavenging Biomechanical Energy for Sustainably Powering Wearable Electronics, Zhang, et al. (February 2015), retrieved from URL littp://pubs.acs.org/doi/abs/10.1021/nn507455f. This is important in that the position of the shutter 4 and the connected plurality of generators 24 varies dynamically during operation as the shutter 4 is opened and closed, as well as statically based on the shape and design of the shutter 4 and the vehicle 1. Reference 1 and Reference 2 are hereby incorporated in their entirety. FIG. 6A, FIG. 6B, and FIG. 6C further describe an example hybrid TENG.

In another example, the generator 24 may be a piezoelectric generator that uses a piezoelectric effect, solely or in combination with other effects such as those described above, to harvest energy.

FIG. 4B is a front view of a section of the example shutter 4 described by FIG. 4A, including the shutter pin 8 disposed along the length of the shutter 4, and the plurality of generators 24. In other embodiments the plurality of generators 24 may be embedded inside the shutter 4, on a first side of the shutter 4, on a second side of the shutter 4, or form the shutter 4 itself, in a variety of combinations and arrangements.

FIG. 5 is a diagram of the layout of an embodiment of the electrical system 40 of the grille assembly 2 (FIG. 3A and FIG. 3B) and shows how the components are connected. The plurality of generators 24 is connected to a shutter 4 (described by FIG. 4A and FIG. 4B) and generates electricity that is transmitted to an energy storage device 26. The energy storage device 26 transmits electricity through a voltage converter 28 to raise the voltage to a sufficient level to power the electric motor 14 (also shown in FIG. 3A and FIG. 3B). The controller 6 regulates the process of transmitting electricity from the energy storage device 26 to the voltage converter 28 to provide appropriate power to the electric motor 14.

In one embodiment, the grille assembly 2 is installed fully self-contained in a vehicle 1 (FIG. 1), and the grille assembly 2 may be actuated by the controller 6 on the basis of data only detected by an array of sensors 30 contained on or within the grille assembly 2. For example, the array of sensors 30 has at least one from a group consisting of air speed sensors, pressure sensors, or temperature sensors.

In another embodiment, the controller 6 may receive input signals from sources external to the grille assembly 2, and determine when and how much electricity to supply to the electric motor 14 to open or close the plurality of shutters 4 based on the signals received, and the extent or degree to which the electric motor 14 is to open or close the plurality of shutters 4 in cases that are not binary.

In another example, sensor data may be supplied to the controller 6 by wired or wireless connections, from sources external to the grille assembly 2 whether they are from on-board the vehicle 1 or originate from sources external to the vehicle 1, when the controller 6 is configured to receive such signals. Signals received by the controller 6 may include, but are not limited to, coolant inlet and outlet temperatures, engine revolutions per minute (RPM), vehicle speed, selected transmission gear ratio, throttle position, engine load, road grade, air inlet pressure, ambient air temperature, and the status of accessory use, such as the use of air conditioning.

Further, the controller 6 may have the capability to transmit data to external devices and networks such as a receiver or controllers of the vehicle 1 or a mobile device.

FIG. 6A is a diagram of an embodiment of a generator 24. The generator 24 is a hybridized nanogenerator (TENG) comprising a TENG 34 and a TENG 36. The TENG 34 generates electrical power when excited in a horizontal direction while the TENG 36 generates electrical power when excited in a vertical direction. Connected to the shutter 4 (FIG. 4A and FIG. 4B), the generator 24 can produce electrical power in any orientation, whether vertical, horizontal, or in between.

FIG. 6B is a diagram of an embodiment of the generator 24 disposed in a horizontal orientation. The generator 24 is excited by airflow in the horizontal direction. In this case, the TENG 34 of the generator 24 is positioned to generate electrical power.

FIG. 6C is a diagram of an embodiment of the generator 24 disposed in a vertical orientation. The generator 24 is excited by airflow in the same horizontal direction as in FIG. 6B. However, in this case the TENG 36 of the generator 24 is positioned to generate electrical power.

If the generator 24 were excited by the same airflow and positioned between the vertical and horizontal orientations described by FIG. 6B and FIG. 6C, both the TENG 34 and the TENG 36 would generate electrical power since there would be both a horizontal and a vertical component to the excitation of the generator 24. The generator 24 comprising the TENG 34 and the TENG 36 may produce electrical power in any orientation. Thus, in a case the generator 24 is connected to the shutter 4, the generator 24 can produce electrical power when excited in any position of the grille assembly 2.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

What is claimed is:

1. A system for powering an active grille shutter assembly comprising:
   a linkage system connected to at least one shutter;
   a second linkage system connected to an electric motor;
   at least one generator, each generator connected to the at least one shutter;
   an energy storage device connected to the at least one generator;
   the electric motor connected to and powered by the energy storage device, and connected to the linkage system; and
   a controller connected to the energy storage device and the electric motor,
   wherein a position of the at least one shutter is adjusted by the linkage system, the position of the linkage system is adjusted by the electric motor, operation of the electric motor is controlled by the controller, the electric motor is powered by energy stored in the energy storage device, and the energy storage device receives energy from operation of the at least one generator, and wherein the at least one shutter comprises at least two arrays of shutters, each array of shutters comprising a plurality of shutters, a first array of shutters is connected to the linkage system, a second array is connected to the second linkage system such that the first array of shutters and the second array of shutters may open and close independently.

2. A system for powering an active grille shutter assembly comprising:
- a linkage system connected to at least one shutter;
- at least one generator, each generator connected to the at least one shutter;
- an energy storage device connected to the at least one generator,
- an electric motor connected to and powered by the energy storage device, and connected to the linkage system; and
- a controller connected to the energy storage device and the electric motor,
- wherein a position of the at least one shutter is adjusted by the linkage system, the position of the linkage system is adjusted by the electric motor, operation of the electric motor is controlled by the controller, the electric motor is powered by energy stored in the energy storage device, and the energy storage device receives energy from operation of the at least one generator, and
- wherein the at least one generator is a triboelectric nanogenerator.

3. The system according to claim 1, wherein:
the at least one generator is a piezoelectric generator.

4. The system according to claim 1, wherein:
the at least one generator is electrically connected in a circuit arranged in series.

5. The system according to claim 1, wherein:
the at least one generator is electrically connected in a circuit arranged in parallel.

6. The system according to claim 1, wherein:
the at least one generator is electrically connected in a circuit having series and parallel circuits.

7. The system according to claim 1, wherein:
the energy storage device is a capacitor.

8. The system according to claim 1, wherein:
the energy storage device is a battery.

9. The system according to claim 1, further comprising:
a voltage converter electrically disposed between the energy storage device and the electric motor, and connected to the controller.

10. The system according to claim 1, wherein:
the controller receives external input signals.

11. The system according to claim 1, further comprising:
an array of sensors, connected to the controller, wherein the controller receives input signals from the array of sensors.

12. The system according to claim 1, wherein:
the controller transmits output signals to external devices.

13. The system according to claim 1, wherein:
the linkage system is a four bar linkage.

14. The system according to claim 1, wherein: the linkage system is a gear train.

15. A method for operating a self-powered grille shutter assembly, the method comprising:
- harvesting energy from at least one shutter connected to at least one generator;
- storing energy in an energy storage device connected to the at least one generator;
- detecting a need to move the at least one shutter;
- receiving data from sources external to the self-powered grille shutter assembly;
- powering an electric motor using energy harvested by the at least one generator and stored by the energy storage device; and
- controlling operation of the electric motor to adjust the position of the at least one shutter.

16. The method of claim 15, further comprising:
receiving data from an array of sensors connected to the self-powered grille shutter assembly.

17. The method of claim 15, wherein:
in the harvesting the at least one generator is at least one triboelectric nanogenerator.

* * * * *